Figure 1:
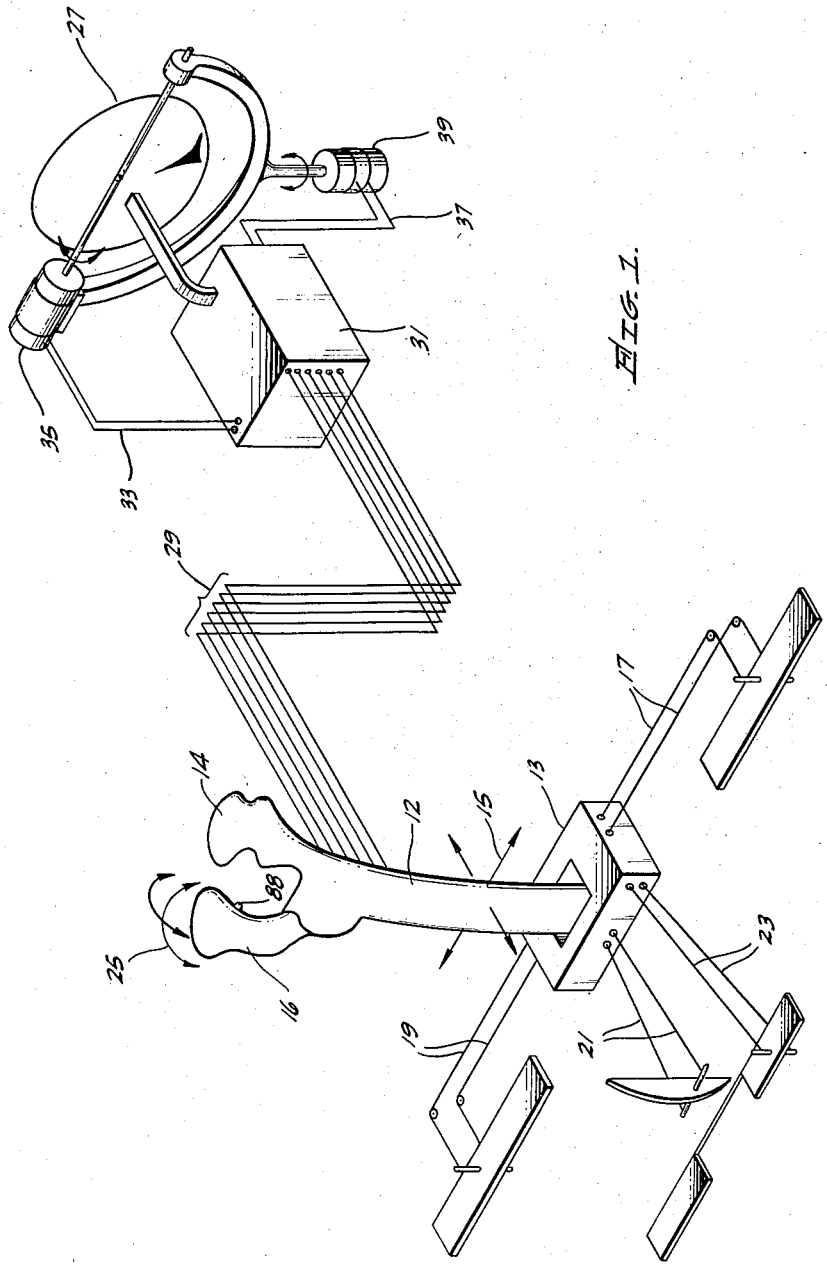

May 5, 1959 R. M. DE HAVEN 2,885,163
AIRCRAFT CONTROL CONSOLE
Filed July 13, 1954 3 Sheets-Sheet 1

INVENTOR.
ROBERT M. DE HAVEN,
BY
Daniel T. Anderson
AGENT.

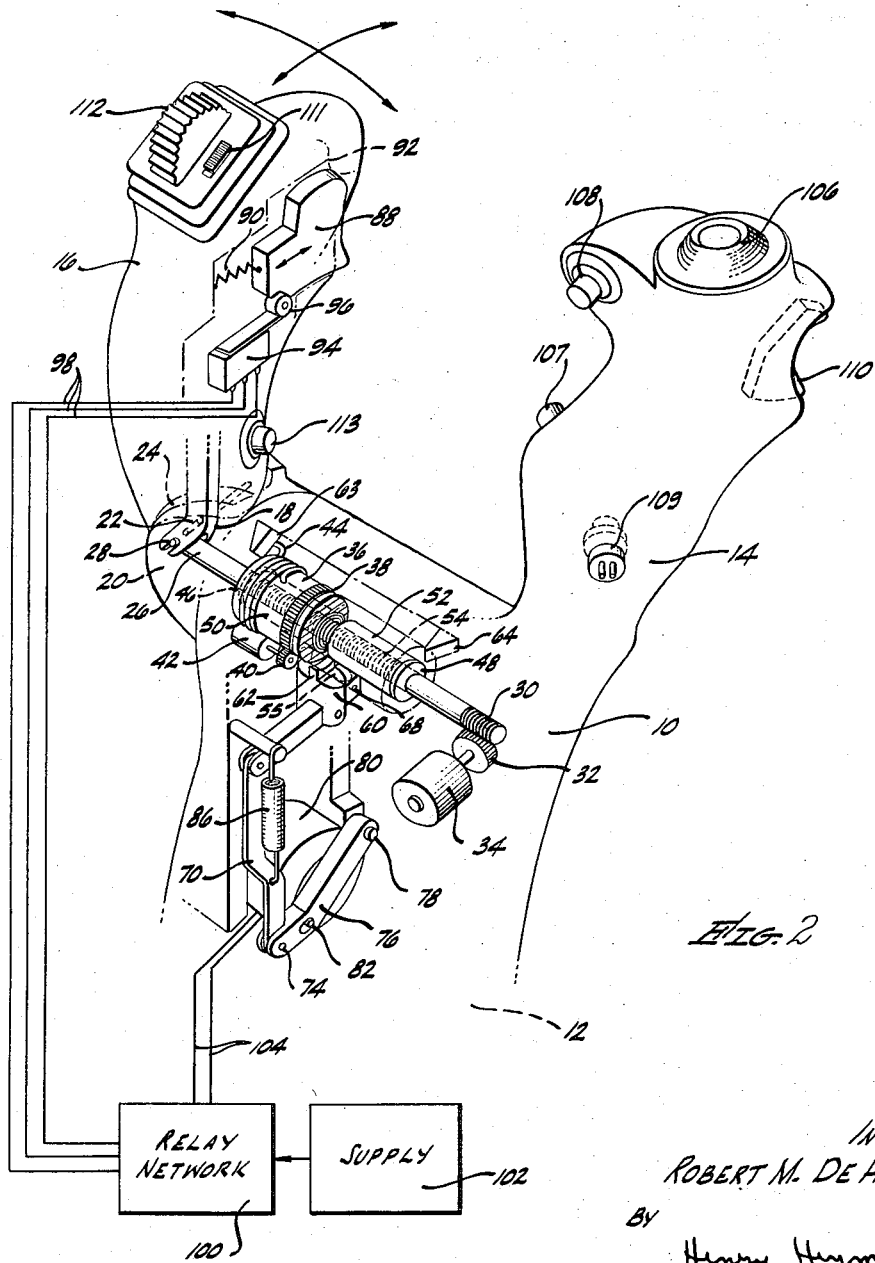

May 5, 1959  R. M. DE HAVEN  2,885,163
AIRCRAFT CONTROL CONSOLE
Filed July 13, 1954  3 Sheets-Sheet 3
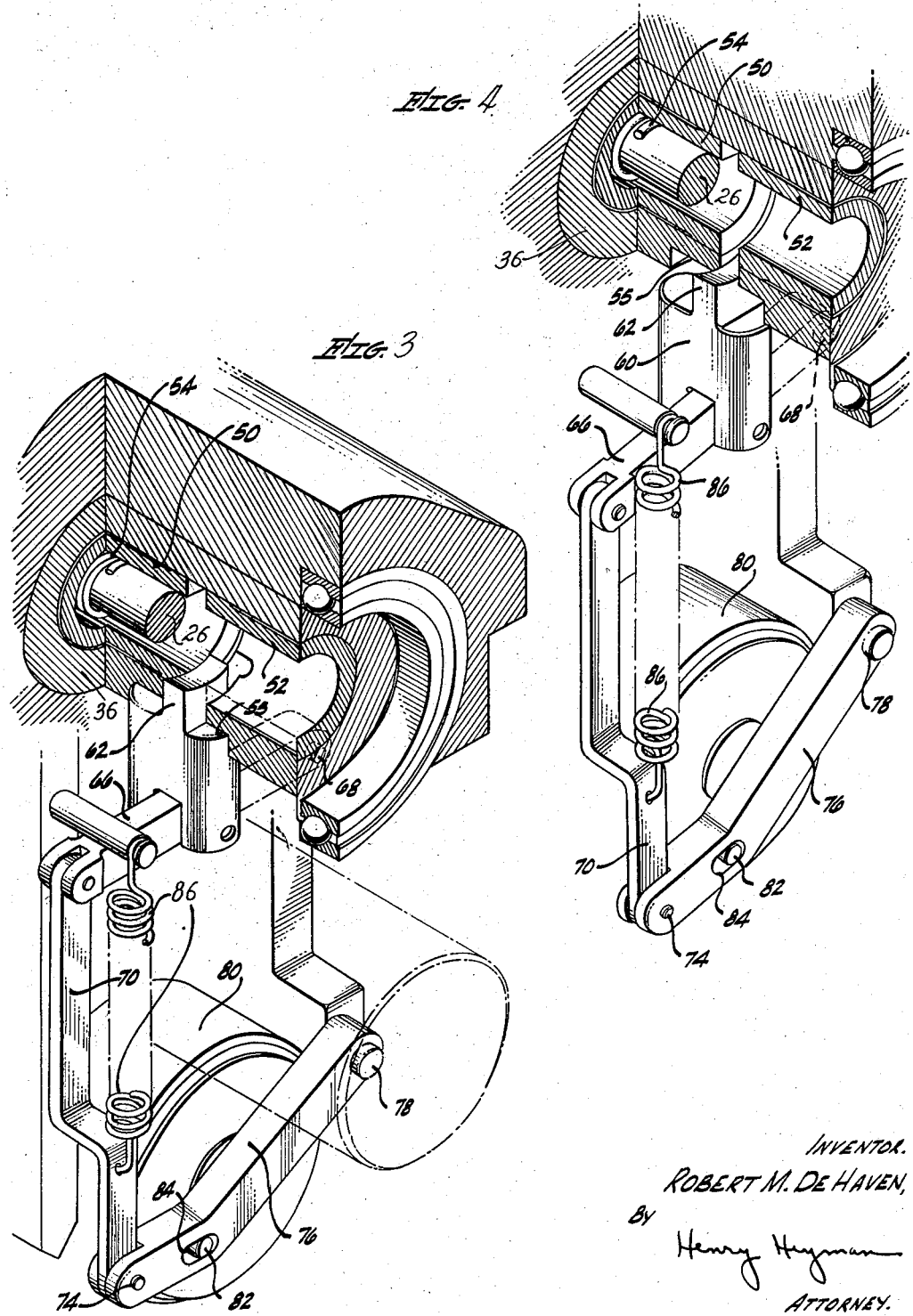
INVENTOR.
ROBERT M. DE HAVEN,
BY
Henry Huyman
ATTORNEY.

2,885,163
AIRCRAFT CONTROL CONSOLE

Robert Marshall De Haven, Studio City, Calif., assignor to Hughes Aircraft Company, Culver City, Calif., a corporation of Delaware Application July 13, 1954, Serial No. 442,956

5 Claims. (Cl. 244—83)

This invention relates to cockpit controls for aircraft, and more particularly to a hand control device which can be moved when in a locked position to function as an airframe flight control, but which can be unlocked and manipulated to control the movements of devices, such as a radar antenna on the aircraft, to which the pilot must direct his attention during flight.

Ordinarily, a pilot is required to operate the aircraft with one hand on the control "stick" and with the other and to operate the radar control with a separate console elsewhere in the cockpit. Having the controls thus separated precludes the pilot's use of both hands on the aircraft control stick or shaft during maneuvers which also require radar operation, as where one hand is occupied with the radar control console at the side of the cockpit. One such system is described in detail in a copending application Serial No. 250,042 filed October 6, 1951, entitled "Disturbed Line-of-Sight Fire Control System," by R. J. Shank et al., assigned to the assignee of the present application. In the radar system there disclosed a hand control, designated there as hand control 1018, is utilized to operate and control the fire control radar system. It is well known in the art of jet flying that when instruments are being used for guidance, when the craft is being flown in tight maneuvers, or whenever careful and exact control is needed, the pilot is aided physiologically and psychologically by having both hands on the control stick or shaft; and further, he is aided if the "stick" is designed for two hands as is a wheel or yoke. Further, it has been determined in the art that a pilot is appreciably aided, again psychologically and physiologically, when both the pilot's hands grasp controls which are the same size and shape and are symmetrically located with regard to the cockpit.

The present invention provides a symmetrical, two-handed control console which permits the use of one hand to operate the radar, when desired, but which at all other times permits both hands to be used in operating the airframe controls. This dual control is achieved in the following manner:

The pilot maneuvers his craft with the radar in automatic search, that is, the airborne antenna automatically sweeps a predetermined section of the space about the craft. During automatic search, the pilot's hands may grip two rigid control yoke handles or branches. One branch contains radar controls and can be unlocked. When it is desired to search out a particular target in a particular direction in the space about the craft, an action button is pressed to unlock that branch. This branch has a universal type of freedom about its base and comprises a separate miniature control column, hereinafter called the radar hand control, which has an action similar to that of an aircraft control stick. Manipulation of this branch remotely controls the radar and the position or orientation of the radar antenna with respect to the aircraft. That is, when the radar hand control is pressed forward by a given displacement, the antenna points downward with a corresponding angular displacement from the axis of the aircraft; in like manner, the radar hand control may remotely point the antenna in any forward direction desired by pressing said action button and positioning the radar hand control to the corresponding angle with respect to the body of the aircraft control column.

The principal object of this invention is therefore to provide an aircraft cockpit control device having two handles, wherein at least one handle can be locked to function as a means to aid airframe operation, but which can be unlocked to be manipulated for operating additional controls on the aircraft.

A further object is to provide, for a radar squipped aircraft, a control console which permits the pilot to keep both hands on the aircraft control column or shaft for controlling airframe operation and the radar equipment.

Still another object is to provide a two-handled control device for the flight control column or stick of an aircraft, wherein one of the handles forms a second movable control column, said one handle being adapted to be locked to form an extension of said flight control stick to aid in controlling airframe flight, and unlocked to be manipulated to control operations other than airframe flight.

Still another object is to provide a two-handed control console, with which one hand of the pilot controls the aircraft and with which the other hand controls the aircraft's radar system when desired, in which both hands grip handles which are symmetrically placed before the pilot and which are similar in shape and size.

A further object is to provide, for a radar equipped aircraft, a means for unlocking and locking a radar hand control so that it may, when desired, be used respectively for radar control or for aiding airframe control.

The novel features of the present invention, both as to its structure and method of operation, together with further objects and advantages thereof, will be more fully understood from the following description of structure and operation considered in connection with the accompanying drawing made a part of this specification. The scope of the invention is pointed out in the appended claims. In the drawings, Fig. 1 is a schematic, functional diagram of an example of the present invention;

Fig. 2 is a perspective view, partially cut-away, of a two-handled control device, in accordance with this invention; and Figs. 3 and 4 are sectional views of the control device of Fig. 2 showing different positions of certain portions of the control device.

Referring now to the drawings: Fig. 1 illustrates in schematic form the over-all cooperation of the various elements of the present invention. An aircraft control column 12 is shown associated with a control center 13. The motion arrows 15 illustrate that the control column 12 may be moved fore and aft and to the left or right. The control center 13 in conventional manner resolves such motion into tension force components in the air frame control surface cables, for example, the right aileron control cables 17, left aileron control cables 19, rudder control cables 21 and elevator control cables 23. Mounted at the top of the control column 12 is a movable hand grip 16 to the left in the drawing, and a fixed hand grip 14 to the right. A prime function of the fixed hand grip 14, as will be explained below, is to control the motion of the control column 12 to which the hand grip 14 is rigidly attached. The movable hand grip 16 may also be rigidly secured to the control column 12 for purposes of allowing either or both of the pilot's hands to control the column 12. When a radar action trigger 88 is pressed the movable hand grip 16 has a universal type of freedom of movement about its base where it is connected to the control column 12. This freedom of motion is indicated by motion arrows 25. As will be discussed below, when the radar action trigger 88 is pressed the angular position of hand grip 16 with respect to the control column 12 determines the direction of pointing of the radar antenna 27. This action is achieved by virtue of Selsyn generators within control column 12 which, as will be discussed more fully below, are actuated in response to the angular position of the movable hand grip 16. Selsyn signals are transmitted over one or more of the electrical conductors 29 to the radar console 31. A set of electrical connectors 33 carries the amplified Selsyn signals to the vertical antenna positioning Selsyn motor 35. Similarly, a pair of electrical conductors 37 carry amplified antenna positioning signals to a horizontal antenna positioning Selsyn motor 39. Mounted also on the hand grip 16 may be a number of other controls (not shown) for the radar system, for example, synchronizer controls, ranging gate controls and IFF identification control (information friend or foe). These functions are discussed below in connection with Fig. 2. Such other controls are connected to radar console 31 by others of the set of electrical conductors 29.

Referring now to the drawings, a housing 10 is located at the top of the aircraft control stick or column 12. A pair of hand grips 14 and 16 are located at opposite sides of housing 10. One hand grip 14 is rigidly fixed to housing 10. The other hand grip 16 is mechanically coupled to the housing by means of a lever arm 18 and a rotatable cup member 20. Arm 18 is embedded in hand grip 16 and extends through a slot 24 in cup 20. Slot 24 is parallel to the axis of housing 10. A pin 22 passes through arm 18 perpendicular to the axis of housing 10 and has its ends attached to the cup. In this manner, hand grip 16 is adapted to be rotated sideways about pin 22.

The end of a shaft 26 extends from housing 10 into cup 20. The free end of arm 18 is forked to straddle the end of shaft 26. The forked ends of arm 18 are notched to rest on a pin 28 which is secured to the end of shaft 26, thereby to provide mechanical linkage for resolving pivoting motion of hand grip 16 about pivot pin 22 into a longitudinal motion of shaft 26.

Shaft 26 extends through the housing and has ridge gear teeth 30 at its opposite end which mesh with a gear 32. The ridge gear teeth 30 are coaxial, circular ridges, as distinguished from helical or worm gear teeth. With this arrangement, longitudinal motion of shaft 26 is resolved into rotation of gear 32, which may be adapted, for example, to turn the armature of a servo-generator 34 to develop an electrical output signal representative of the longitudinal position of shaft 26.

Cup 20 is attached to a hollow cylinder 36 which surrounds shaft 26. Thus, movement of hand grip 16 about the axis of shaft 26 causes arm 18 to bear against the edge of slot 24, which in turn, causes cup 20, shaft 26 and cylinder 36 to rotate. Gear teeth 38, provided on the outer surface of cylinder 36, mesh with a gear 40. Gear 40 is adapted to turn the armature of a servo-generator 42 to resolve the rotation of cylinder 36 into an electrical output signal which is a measure of the rotational position of cylinder 36, and hence, hand grip 16.

A restoring spring 44 is wound about cylinder 36 with one end affixed to cup 20 and the other end affixed to housing 10. The function of spring 44 is to return hand grip 16 to an upright position when it is released, and spring 44 represents any suitable means to accomplish this purpose.

The structure above-described provides means for effecting movement of hand grip 16 about two axes. The electrical signals from servo-generators 34 and 42 may be utilized in a conventional manner to cause the radar antenna on the aircraft to follow the movements of hand grip 16.

So that hand grip 16 can be used with hand grip 14 to move the control stick 12, and alternatively to manually control the position of the radar antenna, locking and unlocking means is provided. One such means comprises a pair of spaced shoulder or support rims 46 and 48 fastened to shaft 26. A pair of sleeve members 50 and 52 surround shaft 26 and are located between the rims 46 and 48. Sleeves 50 and 52 are greater in diameter than rims 46 and 48, but the remote ends of the sleeves have reduced diameter portions to bear against the rims. A compressed spring 54 placed over shaft 26 has a diameter which is less than the inner diameter of sleeves 50 and 52. The ends of spring 54 bear against the remote, reduced diameter portions of sleeves 50 and 52 to keep the sleeves biased against rims 46 and 48. Cylinder 36 substantially surrounds sleeves 50 and 52.

Sleeves 50 and 52 have their adjacent ends spaced when biased as explained above. Further, cylinder 36 is provided with an opening 55 approximately midway along its length which registers with the gap between the sleeves 50 and 52, and which is somewhat wider than the gap between the sleeves. Such gap and opening provide a keyway to receive a locking pin or key 60. A small projection 62 on key 60 fits the gap between the sleeves, and the upper body portion of key 60 fits opening 55.

When the key is inserted in opening 55 and the gap between sleeves 50 and 52, shaft 26 is locked against longitudinal movement and cylinder 36 is locked to prevent its rotation. Hand grip 16 is in an upright position and cannot be moved. Thus locked, hand grip 16 forms a rigid grip which the pilot can use with fixed hand grip 14 to move the control stick 12.

When key 60 is removed from opening 55, a pair of limit pins 63 and 64 fix the amount of longitudinal movement of shaft 26. Limit pins 63 and 64 are fixed to cylinder 36 and bear against the remote ends of respective sleeves 50 and 52. When shaft 26 is moved longitudinally in one direction, limit pin 64 precludes movement of sleeve 52 in that direction. However, rim 46 bears against sleeve 50, and causes it to move against spring 54 to diminish the gap between sleeves 50 and 52. When shaft 26 is moved in the opposite direction, sleeve 50 is limited against movement past limit pin 63, while rim 48 bears against sleeve 52 and forces it toward sleeve 50. In practice, the gap between sleeves 50 and 52 would be dimensioned so that the maximum rotation of hand grip 16 about pin 22 corresponds to the maximum possible angular displacement in azimuth for the radar antenna.

Means for automatically controlling the locking and unlocking of hand grip 16 will now be explained. The lower end of key 60 is forked to receive the body portion of a lever 66, and key 60 is fixed to lever 66. One end of lever 66 is pivotally attached to housing 10, as by means of a pivot pin 68. The opposite end of lever 66 is forked to receive one end of a connecting rod 70; connecting rod 70 is connected to lever 66 for pivotal movement. The opposite end of rod 70 is, in like manner, pivotally connected to one end of a lever 76 by a pin 74. The opposite end of lever 76 pivots about a pin 78 which is attached to housing 10, as indicated by dotted lines. The armature of torque solenoid 80 is coupled to lever 76 by means of pin 82 which fits within a longitudinal slot 84 intermediate to the ends of lever 76. A restoring spring 86, having a compressional stress, is attached at one end to lever 76 and at the other end to housing 10.

An action trigger 88 is embedded within hand grip 16 and is adapted for slidable movement in and out of hand grip 16 against a restoring spring 90 and limiting shoulder 92 within hand grip 16. An electrical switch 94, supported within hand grip 16, is adapted to be actuated by motion of trigger 88 through an actuating lever 96. Switch 94 is any suitable switch having internal electrical contacts which are open or closed in accordance with the digital position of trigger 88. Electrical leads 98 are attached to switch 94 and electrically couple its contact function to a relay network 100, the relay action of which supplies actuating power to the torque solenoid 80 from a power supply 102 through leads 104.

Hand grip 14 may contain conventional operational control means such as; an elevon trim button 106, a microphone switch 107, optical sight control 108, nose wheel steering button 109, and armanent firing trigger 110.

Hand grip 16 may, in like manner, contain operational radar control means such as switch 111 for synchronizer control, switch 112 for range gate control and switch 113 for identification control.

For purposes of explanation of operation, the invention will first be described during that mode in which the radar system is an automatic search, that is, both handles 14 and 16 are, in effect, rigidly attached to the control column about its base near the cockpit floor. Motion of the control column controls the operation of the airframe in a conventional manner.

In this mode, shown in Fig. 3, locking pin 60 is in its up position such that projection 62 is between sleeves 50 and 52 to preclude any longitudinal motion of shaft 26. As previously described, such motion is precluded by virtue of the limiting pins 63 and 64 which permit only motion of the cups in that direction toward the space between them when said space is not filled by projection 62 of the locking key 60. Projection 62 is so held in this position by the restoring tension in spring 86, which pulls up on lever 76 with a force which is transmitted to lever 66 by means of connecting rod 70. The locking key is thus forced upward because it is mounted on lever 66.

The upper portion of key 60 is by the same action inserted through opening 55 and, in such position, precludes rotational motion of cylinder 36; thus cup member 20 is precluded from rotation about the axis of shaft 26. It is therefore seen that with the locking pin in the above described position, all motion of handle 16, relative to control column 12, is precluded. In this mode, action trigger 88 is not depressed, and torque solenoid 80 is not energized.

When action trigger 88 is depressed, as by the operator's left forefinger, switch 94 is adapted to energize solenoid 80 through the action of relay network 100 and power supply 102; thus the mode depicted in Fig. 4 exists. When solenoid 80 is thus energized, lever 76 is pushed downward (against the tension of spring 86) and lever 66, in turn, is pulled downward about its pivot pin 68 by means of connecting rod 70; and key 60 is thereby withdrawn through hole 37 in cylinder 36 to a point such that cylinder 36 is free to rotate, and sleeves 50 and 52 have an open space between them thus allowing motion of either sleeve in the direction of the space between them.

Handle 16 then may pivot about pin 22 to impart longitudinal motion to shaft 26. Assuming an operator pivots hand grip 16 to the left in Fig. 1, shaft 26 is moved to the right and rim 46 presses against sleeve 50; hand grip 16 may be turned to the left until the sleeve 50 closes the space between the sleeves. In so moving shaft 26, ridge gears 30 mesh with and cause rotation of gear 32 which, in turn, rotates the armature of servo-generator 34; and in a conventional manner, its electrical output is used to horizontally position the radar antenna in a left azimuth direction responsive to the degree to which handle 16 was pivoted to the left. Pivoting hand grip 16 to the right similarly causes a right positioning of the radar antenna.

In like manner, a forward thrust or rotation of hand grip 16 about the axis of shaft 26 would cause a similar rotation of cup 20, said rotating force being coupled thereto by pivot pin 22. Cylinder 36 being attached to cup 20 is, in turn, rotated, and gears 38 mesh with and cause rotation of gear 40 which, in turn, causes rotation of the armature of servo-generator 42, the electrical output of which may be adapted, also in a conventional manner, to, for example, vertically position the radar antenna to an angle responsive to the degree of displacement of handle 16 from its restored upright position as determined by restoring springs 44 and 54.

It is thus seen that when action trigger 88 is depressed, the radar antenna may be positioned in an arbitrary direction with respect to the airframe, and handle 16 has a universal type of freedom of motion with respect to housing 10, thereby comprising a miniature control column for pointing the radar antenna; while at all other times, the pilot may use both handles for airframe control with the resulting advantages of improved pilot performance, confidence, and comfort.

Although only one embodiment of the present invention has been shown, the intended scope will be clear from an examination of the appended claims.

What is claimed is:

1. In an aircraft control column of the character adapted for performing attitude control functions, the combination therewith of a mechanism for performing other control functions, said mechanism comprising: first and second spaced hand grips, said first hand grip being rigidly fixed to the control column; means connecting said second hand grip to the control column, said connecting means being adapted to provide pivotal freedom of movement of said second hand grip with respect to said control column, said connecting means being adapted to be locked and unlocked to respectively preclude and permit said pivotal movement of said second hand grip, said second hand grip in the locked position of said connecting means being in substantially fixed spaced relation with said first hand grip, both of said hand grips in said locked position of said connecting means being available to manipulate said control column to perform the attitude control functions; trigger means supported on said second hand grip, said trigger means being coupled to said connecting means and being adapted to be actuated to place said connecting means in its unlocked position for permitting said pivotal motion of said second hand grip; and means coupled to said second hand grip and adapted to perform the other control functions in accordance with the position and motion of said second hand grip.

2. In an aircraft control column of the character adapted for controlling the maneuvering of an airplane, the combination therewith of a mechanism for achieving control of the maneuvering of the airplane and for achieving other control functions, said combination comprising: first and second spaced hand grip columns, said first hand grip column being rigidly attached to the control column for manual manipulation thereof; locking means connecting said second hand grip column to the control column, said locking means being adapted in a first position to hold said second hand grip column rigid with respect to the control column for manual manipulation thereof; deflectable trigger means supported on said second hand grip column; means coupling said trigger means to said locking means, said coupling means being responsive to deflection of said trigger means to cause said locking means to unlock and permit said second hand grip column to be movable relative to said control column; and means coupled to said second hand grip column and adapted to operate in a predetermined manner in response to movement of said second hand grip column relative to the control column for achieving the other control functions.

3. In an aircraft control column of the character adapted for controlling the maneuvering of a radar equipped airplane, the combination therewith of a mechanism for achieving control of the maneuvering of the airplane and for operational control of radar equipment, said mechanism comprising: a substantially symmetrical two-handled terminal for the control column, said two handles being adapted to be gripped by an operator, one f said handles being rigidly secured to the control column for controlling the maneuvering of the airplane; a pivotal connection between said other handle and the control column; and trigger means, said connection being adapted to be locked and unlocked at will by operation of said trigger means to prevent and permit, respectively, said other handle being pivoted, said other handle being adapted to provide through its motion and position with respect to the control column operational control of the radar equipment.

4. In an aircraft control console of the character which contains both aircraft and radar controls adapted for controlling the maneuvering of the aircraft and operation of the radar equipment including a directional radar antenna affixed to the aircraft, the combination therewith of a mechanism for achieving the maneuvering control and equipment operation, said mechanism comprising: a substantially symmetrical two-handled terminal for said console having first and second handles, said first handle being adapted for controlling the aircraft and being rigidly secured to the console, said second handle being structurally connected to the console to permit universal type of freedom of motion of said second handle about its connection with respect to the console; and locking and unlocking means for said structural connection, said locking and unlocking means being adapted in a locked position to prevent said freedom of motion and in an unlocked position to permit said freedom of motion, said second handle in the unlocked position of said locking and unlocking means being adapted to control the angular orientation of the antenna, and said second handle in the locked position of said locking and unlocking means being adapted to be used with said first handle to control the movement of the console.

5. In a radar equipped aircraft having a first control mechanism for actuating control surfaces and a second control mechanism for positioning a radar antenna in a desired direction, the combination of said first and second control mechanism comprising: an aircraft control column; first and second handles, said handles being attached substantially symmetrically to the top of said control column and being adapted to be gripped by an operator's right and left hands, respectively, said first handle being rigidly attached to said column for controlling the orientation of the aircraft, said second handle being pivotally connected to said control column; locking means for said pivotal connection; and trigger means coupled to said locking means, said trigger means being supported on said second handle and being adapted to be actuated by the operator's left hand, said locking means being adapted to lock said pivotal connection upon said trigger being actuated to rigidly connect said second handle structurally to said control column, said trigger means being adapted to unlock said locking means to free said second handle for pivotal movement with respect to said control column, said movement being adapted to be resolved to control the angular orientation of the radar antenna with respect to a predetermined direction.

References Cited in the file of this patent

UNITED STATES PATENTS

| | | |
|---|---|---|
| 1,648,463 | Rohrbach | Nov. 8, 1927 |
| 2,110,989 | Erickson | Mar. 15, 1938 |
| 2,659,275 | Ericsson | Nov. 17, 1953 |

FOREIGN PATENTS

| | | |
|---|---|---|
| 658,302 | Great Britain | Oct. 3, 1951 |

UNITED STATES PATENT OFFICE
CERTIFICATE OF CORRECTION

May 5, 1959

Patent No. 2,885,163

Robert Marshall De Haven

It is hereby certified that error appears in the printed specification of the above numbered patent requiring correction and that the said Letters Patent should read as corrected below.

Column 1, line 24, for "and" read -- hand --; line 56, for "section" read -- sector --; column 2, line 13, for "squipped" read -- equipped --; column 5, line 10, for "armanent" read -- armament --.

Signed and sealed this 1st day of September 1959.

(SEAL)
Attest:
KARL H. AXLINE
Attesting Officer

ROBERT C. WATSON
Commissioner of Patents